United States Patent Office 3,115,011
Patented Dec. 24, 1963

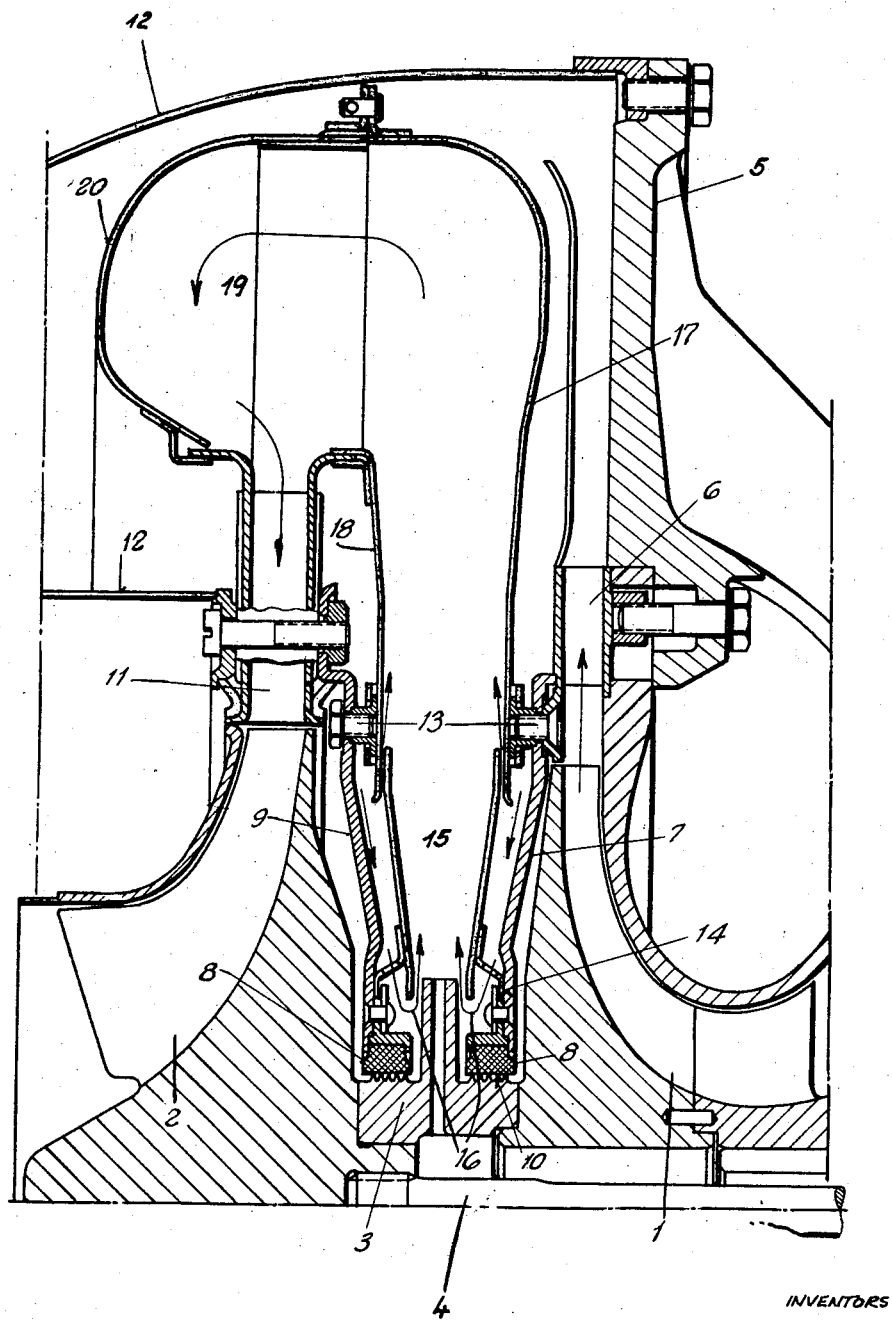

3,115,011
GAS TURBINE CONSTRUCTION
Hans Deinhardt, Karl Muessig, and Karl Prestel, all of Munich, Germany, assignors to BMW Triebwerkbau Gesellschaft m.b.H.
Filed July 22, 1960, Ser. No. 44,727
Claims priority, application Germany Oct. 7, 1959
8 Claims. (Cl. 60—39.36)

The present invention relates to an annular combustion chamber for gas turbines provided with a radial compressor and a radial turbine in which the two rotors are arranged back-to-back with the interposition of a rotary diffuser disk and are surrounded on the outer side thereof by an annular combustion chamber.

This type of construction, known per se, results in a relatively large dimension of the apparatus which is undesirable in particular with small gas turbines since the lengths of the individual combustion chamber sections cannot be smaller than predetermined minimum values for purposes of maintaining the ability thereof to operate properly.

In gas turbines of which the compressor and turbine rotors are arranged back-to-back with the interposition of a diffuser disk, a reversing combustion chamber provided with a radial outwardly directed flow therethrough is preferably used, the radial extent or dimension of which is composed of the diameter of the rotor determined by the design and by the length of the primary section of the combustion chamber which for purposes of avoiding flame-out of the combustion cannot fall below a predetermined minimum length. Adjoining next is the secondary section of the combustion chamber the length of which is determined by the length of combustion of the fuel, and finally the reversing section of the combustion chamber in which the combustion gases are deflected in the direction of flow thereof and are supplied to the turbine rotor. With the known constructions of the prior art, all of these lengths or dimensions add to one another and result in an external diameter for the installation which is inappropriate and disturbing, especially with small portable units.

The present invention is concerned with the problem to avoid these disadvantages and drawbacks. This goal is achieved in accordance with the present invention by the construction of the annular combustion chamber as a disk-shaped flat chamber provided with a radial outwardly-directed flow, of which the primary section is disposed essentially between the rotors and of which the primary air inlet is arranged on both sides of the diffuser disk in proximity to the axis thereof. The effective diameter of the diffuser disk is thereby intended to be larger in accordance with the present invention than the diameter of the annularly-shaped aperture of the combustion chamber inlet.

In the actual construction of the present invention, two dish-shaped disks having seals with respect to the diffuser disk are provided as support means of the combustion chamber which dish-shaped disks, centered in the stationary housing part, assure the required rotary play with respect to the rotating diffuser disk and at which are secured in a resilient manner the combustion chamber walls in order to avoid the reaction of unavoidable thermal stresses on the rotary play of the sealing place.

The secondary and reversing section of the combustion chamber in accordance with the present invention is composed essentially of an outer dish-shaped member and of an inner disk-shaped member which are bridged by a further dish-shaped member within the reversing section of the combustion chamber whereby the turbine guide means or distributor structure is included therein by means of a plug-type connection between the same and the inner disk-shaped member.

The sealing with respect to the rotor takes place by means of a lining or fillet arranged along the inner diameter of the supporting disks which is preferably made of a non-metallic material, for example, graphite, and against which abut the labyrinth webs of the diffuser disk during rotation thereof.

Accordingly, it is an object of the present invention to provide a gas turbine construction of the type in which the turbine and compressor rotors thereof are arranged back-to-back, and which avoids the inadequacies and shortcomings of the prior art constructions.

Another object of the present invention resides in the provision of a small, portable gas turbine in which the dimensions are relatively small not withstanding a very efficient arrangement of the various parts.

Still a further object of the present invention is a gas turbine installation minimizing the effects of thermal stresses on the rotating parts during operation thereof, especially insofar as the rotary play of the rotating members is concerned.

These and other objects, features and advantages of the present invention will become more obvious from the following description when taken in connection with the accompanying drawing which shows in the single FIGURE thereof, for purposes of illustration only, one embodiment in accordance with the present invention, the single figure being a partial cross-sectional view through a gas turbine in accordance with the present invention.

Referring now more particularly to the drawing, reference numeral 1 designates therein the compressor rotor while reference numeral 2 designates therein the turbine rotor. The compressor rotor 1 and the turbine 2 are arranged back-to-back with respect to each other with the interposition therebetween of a rotary diffuser disk 3. Additionally, the compressor rotor 1 and the turbine rotor 2 are threadably connected with each other by means of an anchoring bolt member 4. A dish-shaped supporting disk 7 is centered within the housing part 5 by means of the compressor guide means or compressor distributor structure 6 which supporting disk 7 is provided along the inner diameter thereof with a lining or fillet 8, preferably made of non-metallic material, such as graphite, against which the labyrinth webs 10 of the rotating diffuser disk 3 abut rotatingly in sealing relationship therewith. A second supporting disk 9 provided with a further non-metallic lining or fillet 8 is centered by means of the turbine guide means or distributor structure 11 and the housing part 12.

The combustion chamber which is constructed as a flat chamber provided with a radial, outwardly-directed flow is resiliently secured in points 13 and 14 at the supporting disks 7 and 9 so that warping and deformations of the chamber due to thermal stresses remain without reaction on the rotating parts, especially on the seal at the combustion chamber inlet. The combustion chamber is furthermore constructed in such a manner that the primary section 15 thereof is arranged essentially within the space enclosed by the rotors 1 and 2 whereby the primary air inlet 16 is disposed on both sides of the diffuser disk 3 in proximity to the axis of rotation thereof.

The secondary section together with the reversing section 19 of the combustion chamber is composed essentially of two dish-like members 17 and 20 and of a disk-shaped part 18, whereby the dish-like member 17 and the disk-shaped part 18 form the secondary section, and the turbine guide or distribution means is enclosed by the reversing dish-like member 20 and the disk-shaped part 18.

While we have shown and described one embodiment in accordance with the present invention, it is understood that the same is not limited to the details shown and described herein, but is susceptible of many changes and modifications within the spirit and scope of the present invention and we, therefore, do not wish to be limited to the details shown and described herein but intend to cover all such changes and modifications as are encompassed by the scope of the appended claims.

We claim:

1. An annular combustion chamber arrangement for gas turbines provided with a relatively stationary housing part, with radial compressor means and with radial turbine means each having rotor means, said rotor means being arranged back-to-back with the interposition of a rotary diffuser disk, said rotor means extending radially outwardly beyond said diffuser disk, an annular combustion chamber provided with essentially radial outwardly directed flow and comprising wall members lying in planes extending substantially radially outward of said rotary diffuser disk, said wall members comprising wall portions defining a disk-shaped flat chamber including the primary section of said combustion chamber, said primary section being provided with a primary air inlet arranged on both sides of said diffuser disk in proximity to the axis of the arrangement, support means for said wall members comprising two approximately dish-shaped disk members supported by said stationary housing and having seal means on both sides of said diffuser disk, said disk members having portions extending radially outwardly of said diffuser disk and adjacent said rotor means, and means yieldably connecting said wall portions and said dish-shaped disk members.

2. An annular combustion chamber arrangement for gas turbines according to claim 1, wherein said combustion chamber includes secondary section and a reversing section, said secondary section comprising two of said radially extending wall portions, one of said two wall portions forming part of a dish-shaped member, said dish-shaped member having a curved portion comprised in said secondary section, said secondary section further comprising a further dish-shaped member connected to said first-named dish-shaped member and supported by the distributor means of said turbine means.

3. An annular combustion chamber arrangement for gas turbines according to claim 2, wherein said seal means are disposed along the inner diameters of said dish-shaped disk members, said diffuser disk being provided with labyrinth webs rotatingly abutting against said seal means.

4. An annular combustion chamber arrangement for gas turbines according to claim 3, wherein said seal means are non-metallic fillets.

5. An annular combustion chamber arrangement for gas turbines according to claim 3, wherein each said primary inlet comprising an annular aperture, the effective diameter of said diffuser disk being larger than said aperture.

6. A combustion chamber arrangement for gas turbines comprising radial compressor means, radial turbine means, each having rotor means, said rotor means being arranged back-to-back and defining therebetween a space of greater extent in its radial direction than in its axial direction, a rotary diffuser disk member in said space adjacent both said rotor means, said diffuser disk member having axially spaced web portions, a disk-shaped annular combustion chamber comprising a primary section disposed in said space and constituted by wall members lying in planes extending substantially radially outward of said diffuser disk member, said wall members having end portions adjacent said diffuser disk member, air inlet passage means disposed on both sides of said diffuser disk member and including said end portions, support means for said wall members comprising supporting disk members in said space intermediate said rotor means and said wall members, each of said disk members being adjacent one of said rotor means, said disk members being provided with seal means engaging said axially spaced web portions of said diffuser disk member, and means minimizing the effects of thermal deformation of said wall members on said seal means, said minimizing means being comprised by yieldable connecting means between said wall members and said supporting disk members.

7. A gas turbine installation according to claim 6, wherein said seal means include non-metallic fillet means.

8. A gas turbine installation according to claim 6, wherein said combustion chamber includes a plurality of parts enclosing therebetween guide means of said turbine.

References Cited in the file of this patent

UNITED STATES PATENTS

| | | |
|---|---|---|
| 2,856,755 | Szydlowski | Oct. 21, 1958 |
| 2,924,937 | Leibach | Feb. 16, 1960 |
| 2,963,307 | Bobo | Dec. 6, 1960 |